United States Patent
Fujiwara et al.

(10) Patent No.: US 7,244,529 B2
(45) Date of Patent: Jul. 17, 2007

(54) ALKALINE DRY BATTERY

(75) Inventors: Shuji Fujiwara, Moriguchi (JP); Shigeto Noya, Neyagawa (JP); Yasuo Mukai, Moriguchi (JP); Michiko Fujiwara, Kadoma (JP); Shinichi Sumiyama, Hirakata (JP); Takeshi Okubo, Hirakata (JP); Yasuko Hoshina, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 609 days.

(21) Appl. No.: 10/484,089

(22) PCT Filed: May 17, 2002

(86) PCT No.: PCT/JP02/04827

§ 371 (c)(1),
(2), (4) Date: Jan. 16, 2004

(87) PCT Pub. No.: WO03/009406

PCT Pub. Date: Jan. 30, 2003

(65) Prior Publication Data

US 2004/0166411 A1    Aug. 26, 2004

(30) Foreign Application Priority Data

Jul. 19, 2001 (JP) .............................. 2001-220404
Aug. 30, 2001 (JP) .............................. 2001-261176

(51) Int. Cl.
*H01M 4/06* (2006.01)
*H01M 4/42* (2006.01)

(52) U.S. Cl. ..................................................... 429/229
(58) Field of Classification Search ................. 429/229
See application file for complete search history.

(56) References Cited

U.S. PATENT DOCUMENTS 6,022,639 A * 2/2000 Urry ........................... 429/229
6,235,422 B1 * 5/2001 Kaplan et al. ............... 429/161

FOREIGN PATENT DOCUMENTS

| JP | 57-182972 | 11/1982 |
|---|---|---|
| JP | 58-112254 | 7/1983 |
| JP | 03-257755 | 11/1991 |
| JP | 05-335006 | 12/1993 |
| JP | 11-111256 | 4/1999 |
| JP | P2001-155707 | 6/2001 |
| WO | WO 99/07030 | 2/1999 |

OTHER PUBLICATIONS

Linden, "Handbook of Batteries" McGraw-Hill Inc, 1995. pp. 10.2 and 10.6.*

* cited by examiner

*Primary Examiner*—Gregg Cantelmo
(74) *Attorney, Agent, or Firm*—McDermott Will & Emery LLP

(57) ABSTRACT

In order to obtain an alkaline dry battery low in the possibility of electrolyte leakage and excellent in discharge performance as well as an alkaline dry battery which is not likely to cause an internal short circuit even with the use of a thin separator, as a zinc powder used is one including 65 to 75 wt % of first zinc particles having a particle size of larger than 75 μm and not larger than 425 μm, and 25 to 35 wt % of second zinc particles having a particle size of not larger than 75 μm.

4 Claims, 1 Drawing Sheet

ALKALINE DRY BATTERY

TECHNICAL FIELD

The present invention relates to an alkaline dry battery excellent in discharge performance and safety.

BACKGROUND ART

With advance and progress of portable information devices such as mobile phones and digital cameras, there have been desired alkaline dry batteries capable of highly loaded discharge.

With regard to this, in conventional alkaline dry batteries, a particle size of a zinc powder contained in a gel negative electrode has been made small for improving highly loaded discharge performance. Specifically in practice has been to increase the amount of the zinc particles having a small particle size in the particle size distribution of the zinc powder. This is aimed at improving the reaction efficiency of the negative electrode attributed to the large specific surface area of the zinc particles having a small particle size.

However, there is a problem in such improvement of the reaction efficiency by immoderately reducing the particle size of the zinc powder, that in a case where a battery is short-circuited, the surface temperature of the battery rises and thereby the amount of gas generated inside the battery increases, resulting in the higher possibility of electrolyte leakage outside of the battery.

That is to say, in the conventional technique, it has been relatively difficult to realize both improvement of discharge performance by reducing the particle size of the zinc powder and safety maintenance, in a balanced manner.

Also in the conventional alkaline dry battery, as a negative electrode active material used has been a zinc powder including 90% or more of zinc particles having a relatively large particle size of 75 to 425 µm, and as a separator used has been one having a thickness of about 300 µm.

As described above, however, there has been a demand for alkaline dry batteries capable of highly loaded discharge and having long cycle life, with recent advance and progress of portable information devices such as mobile phones.

In response to this demand, studies have been made on reduction in thickness of the separator for lowering the resistance of the separator so as to improve the highly loaded discharge performance.

However, there has been a problem, in reduction in thickness of the separator with the use of the conventional zinc powder having a large particle size, that an internal short circuit may occur in the battery in such highly loaded discharge as 3.9 Ω for 5 minutes/day. This is because the zinc powder is oxidized corresponding to the battery reaction and the crystals of zinc grow to be acicular, which penetrate the separator to cause the internal short circuit.

On the other hand, another effort to improve the highly loaded discharge performance has been made by increasing a proportion of a zinc powder having a small particle size to be used as a negative electrode active material. It has been revealed, in this effort, that an increase in proportion of the zinc powder having a small particle size allows effective suppression of the internal short circuit of the battery.

Then, a first object of the present invention is to provide an alkaline dry battery low in the possibility of electrolyte leakage and excellent in discharge performance. Further, a second object of the present invention is to provide an alkaline dry battery which is unlikely to cause an internal short circuit even with reduction in thickness of the separator, by leading to a favorable relation between the particle size of the zinc powder and the thickness of the separator.

DISCLOSURE OF INVENTION

In order to solve the above problem, the present invention is primarily characterized in that in an alkaline dry battery comprising a negative electrode containing a zinc powder, an electrolyte, a separator and a positive electrode, as the zinc powder used is one including 60 to 80 wt % of first zinc particles having a particle size of larger than 75 µm and not larger than 425 µm and 40 to 20 wt % of second zinc particles having a particle size of not larger than 75 µm.

It is preferable that when the zinc powder includes 65 to 75 wt % of first zinc particles having a particle size of larger than 75 µm and not larger than 425 µm and 35 to 25 wt % of second zinc particles having a particle size of not larger than 75 µm, the electrolyte contains 37.5 to 38.5 wt % of KOH.

It is also preferable that the separator has a thickness of 190 to 320 µm. The thickness of the separator here refers to a total thickness of the separator before absorption of the electrolyte inside the battery. Generally used is a separator obtained by laminating thinner separators to be cylindrical and folding down one of the open ends thereof to finally have a cylinder-shaped configuration. Namely, the thickness of the separator in the present invention refers to a total thickness of the separator thus configured and accommodated inside the battery before absorption of the electrolyte. For example, when a separator having a thickness of X (µm) is doubled to be cylindrical and accommodated inside the battery, the thickness of the separator is 2X (µm).

It is also preferable that when the zinc powder includes 65 to 75 wt % of first zinc particles having a particle size of larger than 75 µm and not larger than 425 µm and 35 to 25 wt % of second zinc particles having a particle size of not larger than 75 µm, the electrolyte contains 37.5 to 38.5 wt % of KOH, and the separator has a thickness of 190 to 320 µm.

BEST MODE FOR CARRYING OUT THE INVENTION

Figure 1:
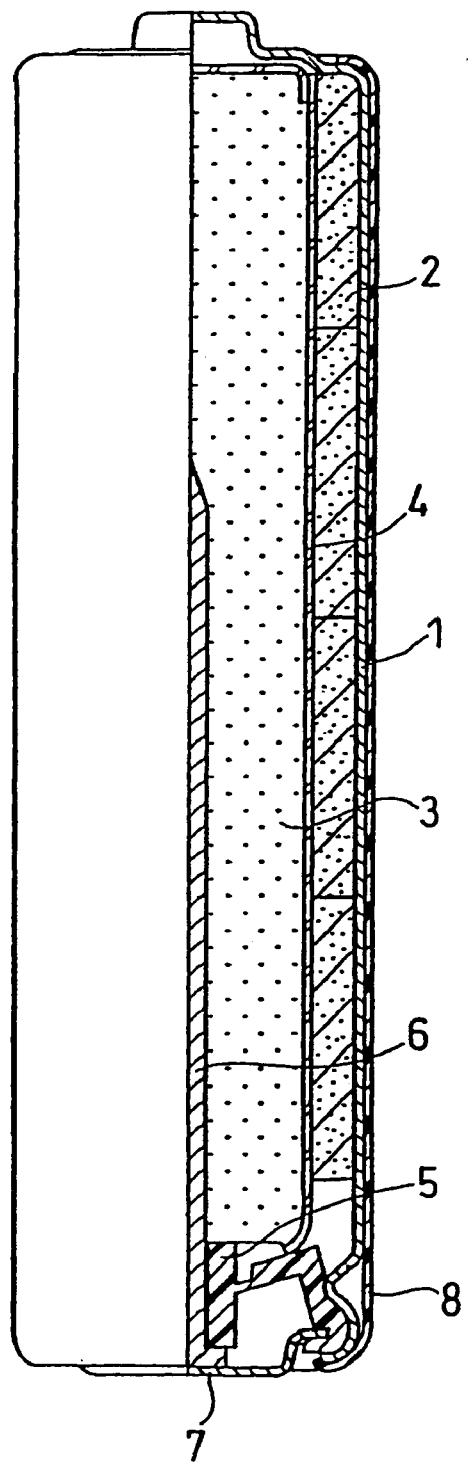
FIG. 1 is a front view of part in cross-section of one example of an alkaline dry battery in accordance with the present invention.

An alkaline dry battery in accordance with the present invention is primarily characterized in that as a zinc powder of a negative electrode, one including 65 to 75 wt % of first zinc particles having a particle size of larger than 75 µm and not larger than 425 µm and 25 to 35 wt % of second zinc particles having a particle size of not larger than 75 µm is used.

Below, a description will be given to two preferable embodiments in accordance with the present invention.

EMBODIMENT 1

As thus described, in the conventional technique, a particle size of a zinc powder to be added to a negative electrode has been reduced from the viewpoint of improving discharge performance of a battery. Specifically, a zinc powder including 95 wt % of first zinc particles having a particle size of 75 to 425 μm and 5 wt % of second zinc particles having a particle size of smaller than 75 μm has been used. Further, the concentration in a KOH aqueous solution used for an electrolyte has been 40 wt %.

As opposed to this, an alkaline dry battery in accordance with Embodiment 1 of the present invention comprises a negative electrode containing a zinc powder, an electrolyte containing KOH and a positive electrode containing manganese dioxide and a graphite powder, the zinc powder including 65 to 75 wt % of first zinc particles having a particle size of larger than 75 μm and not larger than 425 μm and 25 to 35 wt % of second zinc particles having a particle size of not larger than 75 μm, and the KOH concentration in the electrolyte being from 37.5 to 38.5%.

The present inventors have accomplished an alkaline dry battery in accordance with Embodiment 1 of the present invention which is excellent in safety while maintaining improvement of discharge performance by further reducing the concentration of the electrolyte, since an immoderate increase in amount of the zinc powder having a small particle size allows improvement of discharge performance but relatively increases chances of leakage of the electrolyte to the outside of the battery.

Namely, lowering of the KOH concentration in the electrolyte prevents a reaction product of zinc from dispersing at the time of a short circuit in the battery and suppression of the battery reaction at the time of the short circuit prevents the battery temperature from rising, whereby the risk of liquid leakage can be reduced. It is to be noted that, since excessive lowering of the KOH concentration causes, in particular, deteriorated storage performance of continuous discharge at a constant current, the KOH concentration in the electrolyte is preferably in the range of 37.5 to 38.5 wt %.

The alkaline dry battery in accordance with Embodiment 1 of the present invention may be produced in the usual manner, except that what have been described above are used as the zinc powder for use in the gel negative electrode and the electrolyte.

For example, the positive electrode can be produced by mixing manganese dioxide, a graphite powder and an alkaline solution such as a KOH solution to obtain a positive electrode material mixture and using the usual manner.

EMBODIMENT 2

As thus described, there has been a problem in reducing the thickness of the separator while using the conventional zinc powder that the zinc powder is oxidized corresponding to the battery reaction, to form acicular crystals which penetrate the separator. With regard to this, the present inventors conducted extensive studies on the particle size distribution of the zinc powder and the thickness of the separator.

Particularly, as the zinc powder for the conventional negative electrode active material used has been a zinc powder including 90% or more of zinc particles having a particle size of 75 to 425 μm.

As opposed to this, in Embodiment 2 of the present invention, a zinc powder including 60 to 80 wt % of first zinc particles having a particle size of larger than 75 μm and not larger than 425 μm and 20 to 40 wt % of second zinc particles having a particle size of not larger than 75 μm is used.

When the mean particle size of a zinc particle is made larger than the conventional one, the area of the zinc particle to contribute to the battery reaction is reduced, decreasing the discharge performance. Moreover, when the amount of second zinc particles having a small particle size of not larger than 75 μm is increased to exceed 40 wt % in the zinc powder, safety of the obtained battery at the time of the short circuit is lowered.

The use of the aforesaid zinc powder enables a total thickness of the separator inside the battery to be from 190 to 320 μm without inducing the internal short circuit so that the active material amount of the positive electrode or the negative electrode can be increased to improve the discharge performance.

Herein, in a case where the separator has a thickness of more than 320 μm, the occupied volume of the separator within the battery increases, resulting in the lower amount of the active material which can be contained in the battery, thereby decreasing the discharge performance. And in the case of the separator thickness of less than 190 μm, the internal short circuit occurs more frequently in intermittent discharge.

It should be noted that the thickness of the separator in Embodiment 2 of the present invention refers to a total thickness of the separator before absorption of the electrolyte inside the battery. Generally used is a separator obtained by laminating thinner separators to be cylindrical and folding down one of the open ends thereof to finally have a cylinder-shaped configuration. Namely, the thickness of the separator in accordance with Embodiment 2 of the present invention refers to a total thickness of the separator thus configured and accommodated inside the battery before absorption of the electrolyte. For example, when a separator having a thickness of X (μm) is doubled to be cylindrical and accommodated inside the battery, the thickness of the separator is 2X (μm).

Further, as for a separator having a density of more than 0.35 g/cm$^3$, the separator swells to a greater degree after absorption of the electrolyte and thus the occupied volume of the separator within the battery increases, making it impossible for a desired active material to be filled, and thereby the capacity of the battery becomes smaller. As for a separator having a density of less than 0.25 g/cm$^3$, the void thereof expands to make the internal short circuit more likely to occur, due to penetration of zinc oxide generated corresponding to the battery reaction through the separator and, for these reasons, the density of the separator is preferably from 0.25 to 0.35 g/cm$^3$.

Additionally, fineness of fibers to constitute the separator is preferably not more than 0.5 denier on the ground that, when the fineness is more than 0.5 denier, the separator having been made paper has a large void and hence the internal short circuit due to the penetration of zinc oxide, generated according to the battery reaction, through the separator, is easy to occur. It is to be noted that the fibers are main fibers to constitute the separator, excluding fibers as a binder.

It should be noted that, while a variety of conventionally-used materials can be used as materials for constituting the separator in accordance with Embodiment 2 of the present invention, it is preferable to use a non-woven fabric separator mainly made of polyvinyl alcohol (vinylon) fibers and rayon fibers, by reason of alkali resistance, liquid absorbability and liquid retaining property.

The positive electrode in accordance with Embodiment 2 of the present invention can be produced by, for example, mixing manganese dioxide, a graphite powder and an alkaline aqueous solution such as a KOH aqueous solution to obtain a positive electrode material mixture and using the usual method. Also for the electrolyte, the conventionally-used one can be used.

A front view of part in cross-section of the alkaline dry battery in accordance with the present invention is shown in FIG. 1.

In FIG. 1, a positive electrode material mixture 2 formed to be in the shape of a short-cylindrical pellet, a separator 4 and a gel negative electrode 3 are accommodated inside a battery case 1. As the battery case 1, a steel case with the inside thereof nickel-plated or the like can be used. A plurality of the positive electrode material mixtures 2 are accommodated inside the battery case 1, in the state of intimate contact therewith. The separator 4 is disposed still inside the positive electrode material mixture 2, and the gel negative electrode 3 is filled still inside thereof.

In the following, the present invention will be described more specifically using the examples; however, the present invention is not limited thereto.

EXAMPLES 1 TO 6 AND COMPARATIVE EXAMPLES 1 to 6

In order to produce an alkaline dry battery in accordance with Embodiment 1 above, having the structure shown in FIG. 1, a positive electrode material mixture 2 was produced in the following manner. First, manganese oxide, graphite and an alkaline electrolyte were mixed in the weight ratio of 90:6:1, and the obtained mixture was stirred well and then compression molded to be flaky. Subsequently, the flaky positive electrode material mixture was grinded to be granular positive electrode material mixtures, which were classified with a sieve and the granules of 10 to 100 meshes were compression molded to be hollow-cylindrical so as to obtain the pellet-like positive electrode material mixture 2.

Four of the positive electrode material mixtures 2 were inserted into the battery case 1 and re-molded with a compressing jig to be in intimate contact with the internal wall of the battery case 1.

At the center of the positive electrode material mixture 2 disposed inside the battery case 1 as thus described, a bottomed cylindrical separator 4 was disposed, and then a prescribed amount of the alkaline electrolyte was charged into the separator 4. After a lapse of prescribed time, a gel negative electrode 3 comprising the alkaline electrolyte, a gelling agent and a zinc alloy powder was filled in the separator 4.

For the gel negative electrode 3 used were 1 part by weight of polysodium acrylate as the gelling agent, 33 parts by weight of a potassium hydroxide aqueous solution with the concentration shown in Table 1 and 66 parts by weight of a zinc powder. As the zinc powder used was a mixture of X wt % of second zinc particles having a particle size of not larger than 75 μm, shown in Table 1, and (100-X) wt % of first zinc particles having a particle size of larger than 75 μm and not larger than 425 μm.

As the separator 4, a non-woven fabric (thickness of 220 μm) made by mixing polyvinyl alcohol fibers and rayon fibers in the weight ratio of 7:10 was used. It should be noted that the density of the separator used was 0.30 g/cm³ and the fineness of the fibers to constitute the separator was 0.3 denier. Further, the ratio of the fibers is not limited to this, and other fibers may be added as a binder.

Subsequently, a negative electrode collector 6 was installed in the center of the gel negative electrode 3. It should be noted that the negative electrode collector 6 was integrated with a gasket 5 and a bottom plate 7 also serving as a negative electrode terminal.

Then, the open end of the battery case 1 was cramped on the edge part of the bottom plate 7 via the end of the gasket 5 so that the opening of the battery case 1 was sealed. Finally, the outer surface of the battery case 1 was covered with an exterior label 8 to obtain alkaline dry batteries 1 to 6 of the present invention and comparative alkaline dry batteries 1 to 6.

Evaluation

Plural articles of each of the above alkaline dry batteries 1 to 6 and comparative alkaline dry batteries 1 to 6 were prepared and evaluated as follows.

(i) The Number of Liquid Leakage

Four articles of each alkaline dry battery were prepared, connected in series and short-circuited at ordinary temperature to form a closed circuit, which was stood still for 24 hours. Then the circuit was opened, the number of the battery articles in which liquid leakage occurred after stood still for three days was counted, and the liquid leakage ratio {(battery with liquid leakage/battery without liquid leakage)×100} was shown in Table 1.

(ii) Discharge Performance

First, the alkaline dry batteries at the initial stage (immediately after production) and after storage at 60° C. for seven days were subjected to pulse discharge of 1000 mA, 10 seconds-on and 50 seconds-off conducted for one hour/day, and the discharge time until a voltage reached 0.9 V was measured. The average value of the discharge time of 10 articles of each battery was determined and then indicated by an index, assuming that the initial result of Comparative Example 5 as a Conventional Example was 100. The result was shown in Table 1.

Next, the alkaline dry batteries at the initial stage and after storage at 60° C. for seven days were subjected to continuous discharge at a constant current of 1000 mA until a voltage reached 0.9 V, and the average value of the discharge time of 10 articles of each battery was determined and then indicated by an index, assuming that the initial result of Comparative Example 5 as a conventional example was 100. The result was shown in Table 1. When the same was conducted at a constant current of 500 mA, 250 mA, the similar result to the case of 1000 mA was obtained.

TABLE 1

|  | *A | *B | Liquid leakage ratio(%) | *C Initial | *C Storage at 60° C. | *D Initial | *D Storage at 60° C. |
|---|---|---|---|---|---|---|---|
| Comp. Ex. 1 | 38.0 | 40 | 13 | 119 | 113 | 105 | 104 |
| Ex. 1 | 38.0 | 35 | 0 | 116 | 113 | 103 | 102 |
| 2 | 38.0 | 30 | 0 | 115 | 113 | 104 | 101 |
| 3 | 38.0 | 25 | 0 | 110 | 107 | 102 | 100 |
| Comp. Ex. 2 | 38.0 | 20 | 0 | 102 | 100 | 100 | 94 |
| Comp. Ex. 3 | 37.0 | 30 | 0 | 116 | 114 | 99 | 91 |
| Ex. 4 | 37.5 | 30 | 0 | 116 | 114 | 102 | 101 |
| 5 | 38.0 | 30 | 0 | 115 | 113 | 102 | 101 |
| 6 | 38.5 | 30 | 0 | 113 | 112 | 101 | 101 |

TABLE 1-continued

| | | Liquid leakage ratio(%) | *C | | *D | |
|---|---|---|---|---|---|---|
| *A | *B | | Initial | Storage at 60° C. | Initial | Storage at 60° C. |
| Comp. Ex. | | | | | | |
| 4 | 39.0 | 30 | 11 | 110 | 108 | 100 | 99 |
| 5 | 40.0 | 5 | 3 | 100 | 98 | 100 | 98 |
| 6 | 40.0 | 30 | 23 | 108 | 105 | 100 | 98 |

*A: Electrolyte Concentration (wt %)
*B: Zinc particles of not more than 75 μm (x wt %)
*C: Discharge performance 1, Pulse intermittent discharge
*D: Discharge performance 2, Constant current discharge It is found from Table 1 that when a KOH aqueous solution with a concentration of 37.5 to 38.5 wt % was used and a zinc powder including second zinc particles having a particle size of not larger than 75 μm was used, an alkaline dry battery low in liquid leakage ratio and excellent in discharge performance can be obtained.

EXAMPLES 7 TO 26 AND COMPARATIVE EXAMPLES 7 to 17

Herein, an alkaline dry battery in accordance with Embodiment 2 of the present invention having the structure shown in FIG. 1 was produced.

A positive electrode material mixture 2 was produced in the following manner. First, manganese oxide, graphite and an alkaline electrolyte were mixed in the weight ratio of 90:6:1, and the obtained mixture was stirred well and then compression molded to be flaky. Subsequently, the flaky positive electrode material mixture was grinded to be granular positive electrode material mixtures, which were classified with a sieve and the granules of 10 to 100 meshes were compression molded to be hollow-cylindrical so as to obtain the pellet-like positive electrode material mixture 2. Four of the positive electrode material mixtures 2 were inserted into the battery case 1 and re-molded with a compressing jig to be in intimate contact with the internal wall of the battery case 1.

At the center of the positive electrode material mixture 2 disposed inside the battery case 1 as thus described, a bottomed cylindrical separator 4 was disposed, and then a prescribed amount of the alkaline electrolyte was charged into the separator 4. After a lapse of prescribed time, a gel negative electrode 3 comprising the alkaline electrolyte, a gelling agent and a zinc alloy powder was filled in the separator 4.

As the gel negative electrode 3 used was a gel negative electrode comprising 1 part by weight of polysodium acrylate which was the gelling agent, 33 parts by weight of 38 wt % of a potassium hydroxide aqueous solution and 66 parts by weight of a zinc powder. As the zinc powder used was one having a particle size of not larger than 425 μm and including second particles having a particle size of not larger than 75 μm in the amount (Y wt %) shown in Table 1 .

As the separator 4, a non-woven fabric which was made by mixing polyvinyl alcohol fibers and rayon fibers in the weight ratio of 7:10 and had the total thickness shown in Table 2. It should be noted that the density of the separator used was 0.30 g/cm³ and the fineness of the fibers to constitute the separator was 0.3 denier. Further, the ratio of the fibers is not limited to this, and other fibers may be added as a binder.

Subsequently, a negative electrode collector 6 was installed in the center of the gel negative electrode 3. It should be noted that the negative electrode collector 6 was integrated with a gasket 5 and a bottom plate 7 also serving as a negative electrode terminal.

Then, the open end of the battery case 1 was cramped on the edge part of the bottom plate 7 via the end of the gasket 5 so that the opening of the battery case 1 was sealed. Finally, the outer surface of the battery case 1 was covered with an exterior label 8 to obtain alkaline dry batteries LR6.

Evaluation (i) Occurrence or Non-occurrence of Abnormal Discharge 10 articles of each of the above alkaline dry batteries were prepared and then subjected to intermittent discharge on condition that load was 3.9 Ω, the discharge time was 5 minutes/day and a terminal voltage was 1.0 V. Then, the number of the battery articles where abnormal discharge occurred as voltage steeply dropped due to an internal short circuit in the middle of the discharge was counted.

Herein, the alkaline dry batteries where abnormal discharge occurred with a terminal voltage not less than 1.0 V was indicated as X, ones where abnormal discharge occurred with a terminal voltage not less than 0.75 V and less than 1.0 V as Δ, and ones where abnormal discharge did not occur until a terminal voltage dropped to less than 0.75 V as ○. The results were shown in Tables 2 and 3.

(ii) Life

Next, the above alkaline dry batteries at the initial stage (immediately after production) were subjected to continuous discharge at a constant current of 1000 mA, and the time (minutes) which elapsed until a voltage reached 1.0 V was measured. The results were shown in Tables 2 and 3.

(iii) Safety

Four articles of each of the above alkaline dry batteries were connected in series with a lead wire and short-circuited, and the number of the exploded battery articles was counted. The results were shown in Tables 2 and 3.

TABLE 2

| | *E | *F | Abnormal Discharge | | | *G | Safety |
|---|---|---|---|---|---|---|---|
| | | | X | Δ | ○ | | |
| Comp. Ex. 7 | 320 | 15 | 0 | 1 | 9 | 93 | 0 |
| Ex. | | | | | | | |
| 7 | | 20 | 0 | 0 | 10 | 96 | 0 |
| 8 | | 25 | 0 | 0 | 10 | 98 | 0 |
| 9 | | 30 | 0 | 0 | 10 | 100 | 0 |
| 10 | | 35 | 0 | 0 | 10 | 101 | 0 |
| 11 | | 40 | 0 | 0 | 10 | 102 | 0 |
| Comp. Ex. 8 | 250 | 15 | 0 | 1 | 9 | 98 | 0 |
| Ex. | | | | | | | |
| 12 | | 20 | 0 | 0 | 10 | 100 | 0 |
| 13 | | 25 | 0 | 0 | 10 | 101 | 0 |
| 14 | | 30 | 0 | 0 | 10 | 102 | 0 |
| 15 | | 35 | 0 | 0 | 10 | 103 | 0 |
| 16 | | 40 | 0 | 0 | 10 | 105 | 0 |
| Comp. Ex. 9 | 220 | 15 | 0 | 1 | 9 | 98 | 0 |
| Ex. | | | | | | | |
| 17 | | 20 | 0 | 0 | 10 | 100 | 0 |
| 18 | | 25 | 0 | 0 | 10 | 102 | 0 |
| 19 | | 30 | 0 | 0 | 10 | 102 | 0 |

TABLE 2-continued

|  | *E | *F | Abnormal Discharge X | Abnormal Discharge Δ | Abnormal Discharge ○ | *G | Safety |
|---|---|---|---|---|---|---|---|
| 20 |  | 35 | 0 | 0 | 10 | 103 | 0 |
| 21 |  | 40 | 0 | 0 | 10 | 105 | 0 |
| Comp. Ex. 10 |  | 50 | 0 | 0 | 10 | 108 | 1 |

*E: Thickness of separator (μm)
*F: Zinc particles of not more than 75 μm (wt %)
*G: Constant current discharge

TABLE 3

|  | *E | *F | Abnormal Discharge |  | | *G | Safety |
|---|---|---|---|---|---|---|---|
| Comp. Ex. 11 | 190 | 15 | 0 | 2 | 8 | 101 | 0 |
| Ex. |  |  |  |  |  |  |  |
| 22 |  | 20 | 0 | 0 | 10 | 102 | 0 |
| 23 |  | 25 | 0 | 0 | 10 | 104 | 0 |
| 24 |  | 30 | 0 | 0 | 10 | 105 | 0 |
| 25 |  | 35 | 0 | 0 | 10 | 108 | 0 |
| 26 |  | 40 | 0 | 0 | 10 | 111 | 0 |
| Comp. Ex. |  |  |  |  |  |  |  |
| 12 | 160 | 15 | 6 | 4 | 0 | 103 | 0 |
| 13 |  | 20 | 5 | 5 | 0 | 105 | 0 |
| 14 |  | 25 | 5 | 5 | 0 | 108 | 0 |
| 15 |  | 30 | 4 | 6 | 0 | 111 | 0 |
| 16 |  | 35 | 3 | 7 | 0 | 114 | 0 |
| 17 |  | 40 | 3 | 6 | 1 | 116 | 0 |

*E: Thickness of separator (μm)
*F: Zinc particles of not more than 75 μm (wt %)
*G: Constant current discharge It was found from Tables 2 and 3 that when a separator has a thickness of 190 to 320 μm and a zinc powder includes 20 to 40 wt % of second zinc particles having a particle size of not larger than 75 μm, an alkaline dry battery excellent in battery performance can be obtained.

INDUSTRIAL APPLICABILITY

As thus described, according to the present invention, an alkaline dry battery low in the possibility of electrolyte leakage and excellent in discharge performance can be obtained.

Also, according to the present invention, an alkaline dry battery which is unlikely to cause an internal short circuit even with the use of a thin separator can be provided by controlling a particle size of a zinc powder as well as the thickness of a separator.

The invention claimed is:

1. An alkaline dry battery comprising a negative electrode containing a zinc powder, an electrolyte, a separator and a positive electrode, wherein said zinc powder includes 65 wt. % to 75 wt. % of first zinc particles having a particle size of larger than 75 μm and not larger than 425 μm, and 35 wt. % to 25 wt. % of second zinc particles having a particle size of not larger than 75 μm; and said electrolyte contains 37.5 wt % to 38.5 wt. % of KOH.

2. The alkaline dry battery in accordance with claim 1, wherein said separator has a thickness of 190 μm to 320 μm.

3. The alkaline dry battery in accordance with claim 1, wherein said separator has a density of 0.25 g/cm$^3$ to 0.35 g/cm$^3$.

4. The alkaline dry battery in accordance with claim 1, wherein said separator is constituted by fibers having a fineness of not more than 0.5 denier.

* * * * *